June 12, 1962  V. R. CHIRHART  3,038,274
TOY FLYING BIRD
Filed June 30, 1961
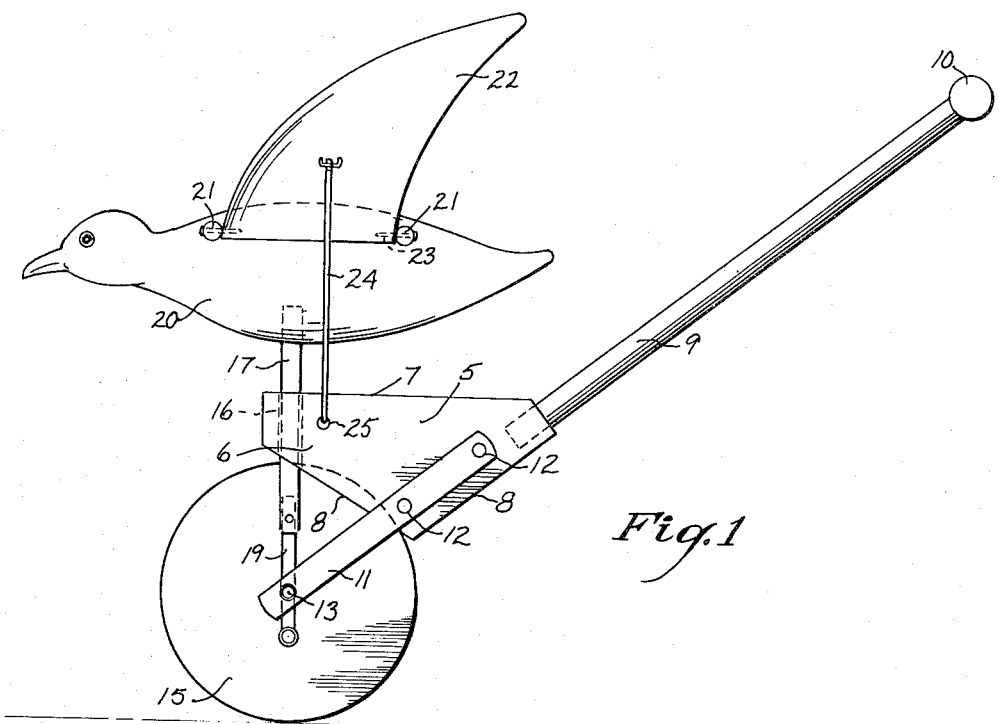
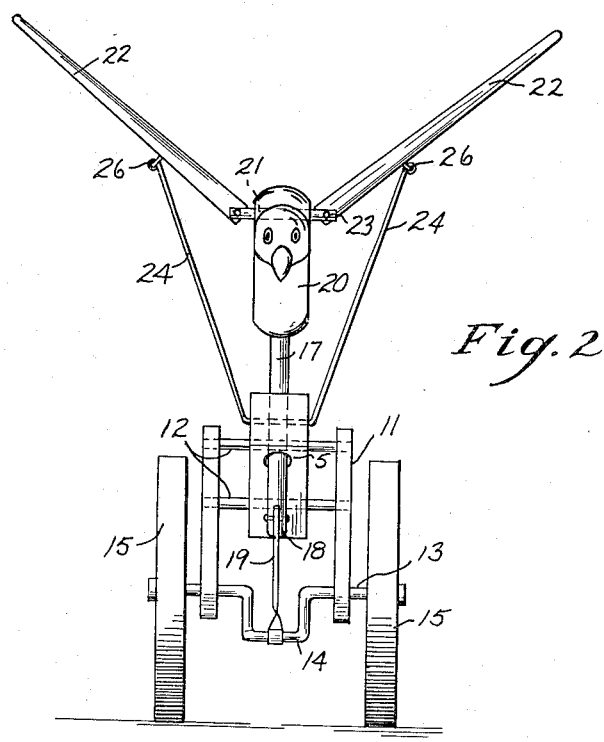
INVENTOR
Virgil R. Chirhart

United States Patent Office 3,038,274
Patented June 12, 1962

3,038,274
TOY FLYING BIRD
Virgil R. Chirhart, 11515 S. Van Ness,
Los Angeles 47, Calif.
Filed June 30, 1961, Ser. No. 121,097
3 Claims. (Cl. 46—107)

This invention relates generally to children's toys, and more specifically to a wheel toy for cooperation with the ground which mounts a bird having pivotally supported wings for actuation during operation of the toy.

A principal object of this invention is to provide a mechanically actuated toy which may be wheeled along the ground and mounts a simulated bird having wings which flap in response to movement of the toy along the ground.

Another object of this invention is to provide a mechanically operated toy of novel construction which is realistic in operation, and entertaining to operate.

Yet another object of the invention is to provide a toy which simulates a flying bird which is simple and robust in construction, enabling manufacture at low cost.

Briefly, the invention involves the provision of a mounting block having a handle projecting upwardly from one end and providing downwardly extending arms for rotatively mounting a cranked axle and terminating wheels for engagement with the ground. A simulated body of a bird is supported by a dowel projecting from the underside. The dowel extends through a hole in the mounting block and connects with the crank portion of the axle so as to reciprocate in a vertical manner through the mounting block upon rotation of the wheel on the ground. The body of the bird has wings which are pivotally connected thereto and project outwardly to either side of the body to simulate a bird in flight. The undersides of the wings are pivotally connected to struts which project upwardly from either side of the mounting block. A central portion of each wing is thus held stationary from vertical displacement, and reciprocating movement of the body mounting dowel will cause the body of the bird to move up and down and give the effect of the bird in flight.

A full understanding of the details of the invention, together with further advantages, will become apparent from the following detailed description of a preferred embodiment thereof, taken in conjunction with the attached drawings wherein:

FIG. 1 is a side elevation of the flying bird toy which comprises my invention.

FIG. 2 is a front elevation of the toy.

Similar reference characters indicate corresponding parts throughout the several views in the drawing.

Referring now to the drawings in detail, the numeral 5 represents a substantially triangular mounting block having parallel side faces 6, a horizontally extending top face 7, and downwardly extending bottom faces 8. Projecting upwardly and parallel with one of the bottom faces 8 is an elongated handle 9 terminating at its upper end with a suitable holding knob 10 disposed at a suitable elevation for operation by a walking child. Arms 11 extend parallel with the handle 9 and beyond the bottom faces 8 of the mounting block, and are secured in a spaced relation to opposite side faces 6 of the block by means of dowels 12 which extend transversely through the block. The arms are drilled at their lower ends and rotatably mount an axle 13 therethrough. The axle is provided with a U shaped crank 14 intermediate the spaced arms 11 and also mounts circular wheels 15 on each end of the axle. A hole 16 is formed vertically through the mounting block and extends normally through the forward portion of the top face 7 thereof, such that it is disposed in vertical alignment with the centre of the axle 13. A bird mounting post 17 slidably extends through the hole 16 and is bifurcated at 18 at its lower end to pivotally mount a connecting link 19 which is rotatably secured at its other end to the crank portion 14 of the axle.

The upper end of the mounting post 17 is securely mounted in the underside of a simulated bird body 20, such that upon rotation of the wheels, the crank 14 will cause reciprocating vertical movement of the body transmitted through the mounting post. Two fixed dowels 21 extend horizontally through the back portion of the body 20 and extend outwardly of each side for pivotally mounting to opposed wings 22. The wings are pivotally mounted between the dowels by pins 23 which extend through the dowel and into the end portion of the wings. The centre under portion of each wing is pivotally secured by a U shaped wire arm 24 projecting in a symmetrical manner through a horizontally extending hole 25 formed through the side of the mounting block 5. The wire arms restrict the movement of the wings in a pivotal manner about the ends of the arms, thus reciprocating vertical movement of the bird body 20 will cause the pivotally associated wings to merely pivot about the upper ends 26 of the wire arms, thereby simulating the bird in flight.

Having described the invention in a preferred form, it will be appreciated that the dimensions of this toy are a matter of choice, and that some modifications may be made to the precise configuration, without departing from the scope or spirit of the invention, as defined by the following claims.

I claim:

1. A toy flying bird, comprising, a mounting block, an elongated handle projecting from the block, spaced arms projecting downwardly from the sides of the block, an axle rotatably supported between the lower ends of the arms, a crank formed in the axle intermediate the arms, a wheel on each end of the axle, a hole formed through the block in alignment with the axle, a mounting post slideably extending through the hole and connected at its lower end to the crank, a simulated bird mounted on the upper end of the post, wings pivotally mounted on each side of the simulated bird, and wire arms projecting from the block for pivotal connection with a portion of each wing outwardly spaced from the wing mounting, such that reciprocating vertical movement of the bird on the mounting post will cause the wings to pivot about the wire arms and simulate flight.

2. A toy flying bird according to claim 1, wherein the lower end of the mounting post is bifurcated, and a connecting link pivotally secured within the bifurcation and extending to terminate in pivotal attachment to the crank.

3. A toy flying bird according to claim 1, wherein dowels project transversely through the upper portion of the bird to pivotally mount the inner ends of the wings therebetween.

References Cited in the file of this patent

UNITED STATES PATENTS

| | | |
|---|---|---|
| 1,708,823 | Arzig | Apr. 9, 1929 |
| 2,410,646 | Finn et al. | Nov. 5, 1946 |
| 2,534,609 | Mann | Dec. 19, 1950 |